Jan. 2, 1962     D. H. GRIFFIN ET AL     3,015,365
SLIDING WEIGHT HOLEPUNCHER FOR THE INSTALLATION OF WELLPOINTS
Filed Aug. 18, 1959     2 Sheets-Sheet 2

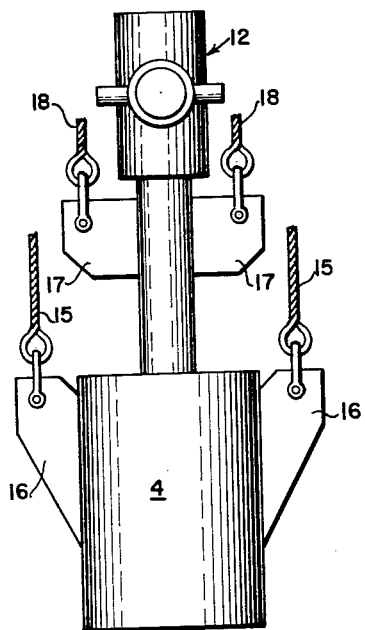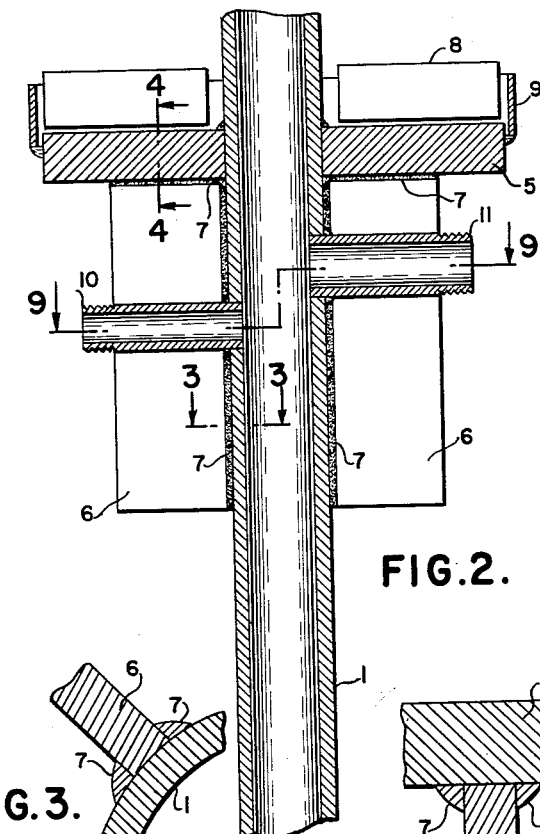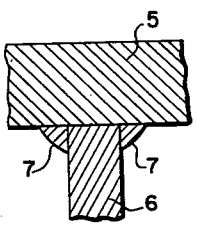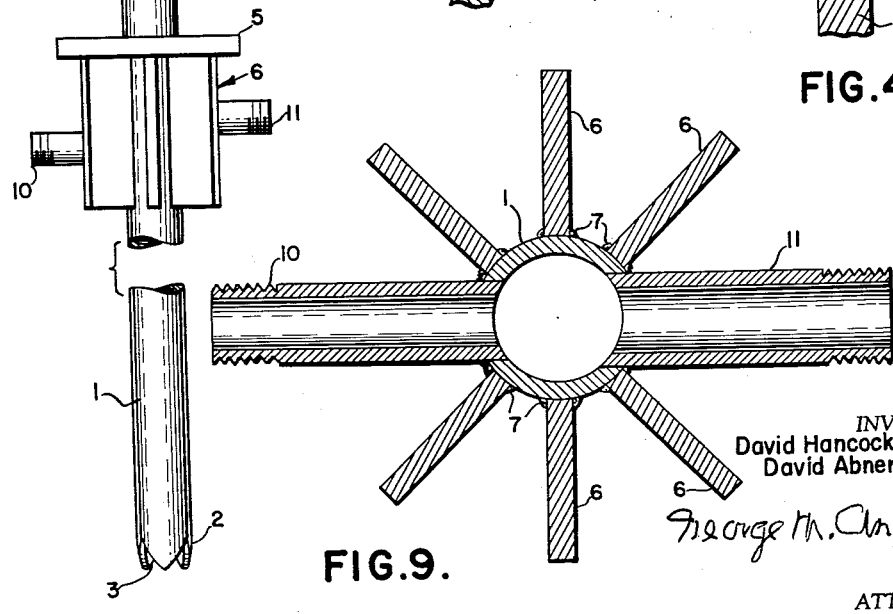

INVENTORS
David Hancock Griffin &
David Abner Werblin

BY George M. Anderson.

ATTORNEY 3,015,365
SLIDING WEIGHT HOLEPUNCHER FOR THE
INSTALLATION OF WELLPOINTS
David H. Griffin, Bronxville, and David A. Werblin, Riverdale, N.Y., assignors to Griffin Wellpoint Corporation, New York, N.Y., a corporation of New York
Filed Aug. 18, 1959, Ser. No. 834,435
2 Claims. (Cl. 175—137)

The invention relates to a sliding-weight hole-puncher for the installation of wellpoints for withdrawing water from the ground, an object of the invention being mainly to provide a sliding-weight holepuncher for the successful and economical installation of wellpoints in soils of varying densities and particularly difficult soils, such as bouldery soils, soils intercalated with layers of hardpan, dolomite limestone soils, cemented gravel, and the like. The invention also consists in the new and improved method for the installation of wellpoints.

Other objects and advantages will appear hereinafter or will be obvious.

The invention consists in the novel construction and combinations of parts and in the novel method as hereinafter set forth in the claims.

In the accompanying drawings:

FIGURE 1 is a side view of the holepuncher;

FIGURE 2 is a central vertical sectional view showing the striking plate and its support on a larger scale;

FIGURE 3 is a detail section on the line 3—3, FIGURE 2;

FIGURE 4 is a detail section on the line 4—4, FIGURE 2;

FIGURE 9 is a section on the line 9—9, FIGURE 2.

Figure 6:
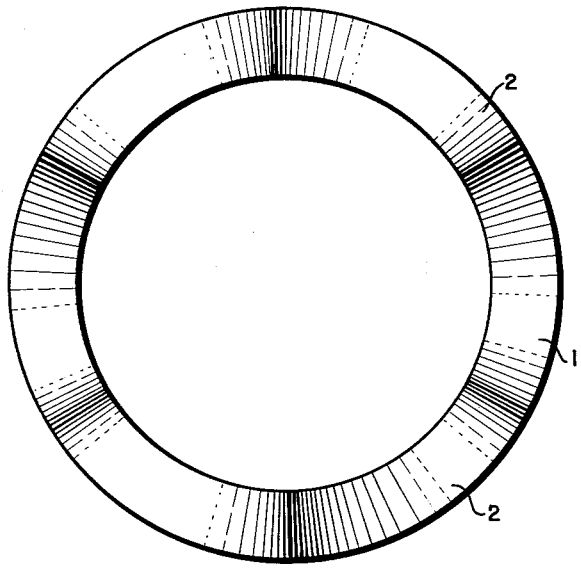
FIGURE 6 is a view similar to FIGURE 5, being a bottom plan view of said teeth.
Figure 7:
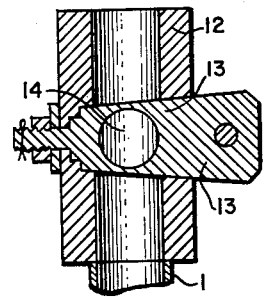
FIGURE 7 is a vertical sectional view of the pressure cap showing the valve in closed position.
Figure 5:
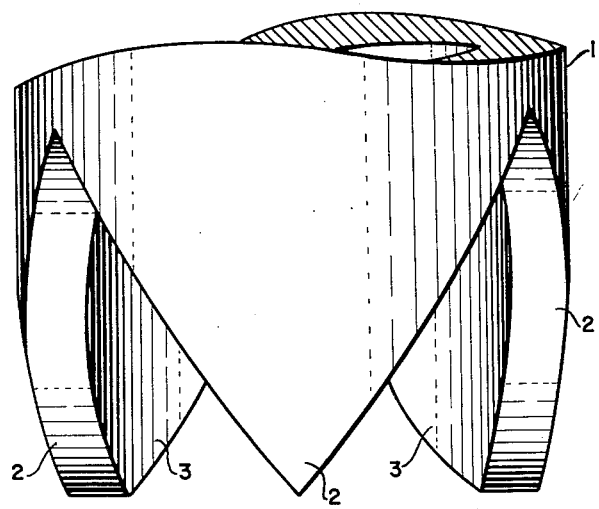
FIGURE 5 is a fragmentary side view of the lower end of the shank showing three wedge form teeth.
Figure 8:
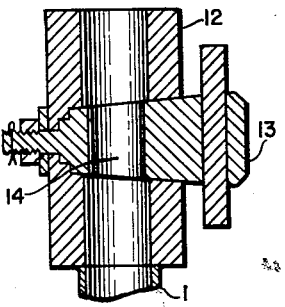
FIGURE 8 is a view similar to FIGURE 7 showing the valve in open position.

Referring to the drawings, 1 designates an elongated tubular cylindrical shank open at both ends thereof, said shank at its lower end having wedge form pointed cutting teeth 2 formed by upwardly tapering recesses 3 therein, the inner and outer surfaces of said teeth being the inner and outer cylindrical surfaces of the tubular wall of said shank, said teeth having throughout the same thickness as that of said tubular wall, the lateral and the pointed cutting edges of said teeth intersecting said tubular wall at approximately right angles. The lateral cutting edges of said teeth converge and intersect in pointed cutting edges located midway of said recesses.

A sliding hammer weight 4 is mounted and freely slidable upon said shank. Manually controllable means to be described are provided for alternately raising said weight and releasing it to cause it to fall by gravity, upon an anvil member 5 rigidly secured to said shank to drive said shank into the ground. Said anvil member consists of an upper striking plate 5 and a lower support 6 therefor.

In order to prevent the striking plate 5 from being stripped from said shank 1 under the enormous strain to which it is subjected by impact thereon of the hammer weight 4 which weighs one ton, said shank is provided with a plurality of vertical radial wings 6 extending circumferentially therearound and upon which said plate rests, said wings having vertical and upper horizontal edges intersecting said shank and said plate at approximately right angles, said wings being fixedly welded to said shank and said plate by welds 7 extending along the full lengths of said vertical and upper horizontal edges and being located in the corners at each side of said intersections, as shown in FIGS. 3 and 4, said wings and said welds constituting said support. It is not practicable to weld said vertical and upper horizontal edges to said shank and said plate where they contact at said intersections, nor would it be practicable to weld the circumferential bore surface of a solid anvil member to said shank. The strength of said support in resisting said strain is dependent upon the lengths of said welds 7.

The striking plate is provided with an overlying cushion 8, which may be of wood, resting thereon, a cushion retainer 9 within which said cushion fits, being welded to said striking plate.

Inlet pipes 10 and 11 for air and for water communicate with the bore of said shank and may have their inner ends located between certain of said radial wings, said pipes serving for the supply of jetting water and/or of compressed air for issuance from the open toothed lower end of said shank. Water is supplied by a standard jetting pump, not shown, and air by a standard air compressor, not shown.

The shank 1 is provided at its upper end with a tubular cylindrical pressure cap 12, open at both ends thereof and the bore of which is of the same diameter as that of said shank, said cap having therein a rotatable valve 13, provided with a diametric port 14 the bore of which is of less diameter than that of said shank. Said valve is normally closed to confine the pressure of water and/or of air within the bore of the shank, so that the water will jet from the open lower toothed end of the shank. Said valve is opened after the hole is punched to the requisite depth for the admission of a well-point assembly which will fall by gravity to the lower end of the shank and remain there after the shank is removed from the punched hole. Any suitable wellpoint assembly may be used, such for example, as those of the Griffin Patents Numbers 2,028,447 and 2,011,518, but not shown herein.

The alternate raising and release of the sliding hammer weight 4 is controlled by the operator of a crane, not shown herein, in known manner, from which crane said weight is suspended by cables 15 secured at their lower ends to lugs 16 welded to said weight. The raising and lowering of the shank 1 is also controlled by said operator in known manner, said shank having lugs 17 welded thereto, to which the lower ends of suspension cables 18 are secured.

The lateral and the pointed cutting edges of said wedge form teeth 2 have stainless steel fused thereto by the use of an electric welding machine, thereby increasing the toughness and wear resistance of said cutting edges. The stainless steel rod has a Brinell hardness number of 130–140. The tubular shank and other parts of the holepuncher are made from hot drawn steel, namely A.S.T.M. A53, with exception of the hammer weight filling of lead, to add weight.

The weight of the shank 1, which is from ½ to 1 ton, plus the impact of the sliding hammer weight 4, which weighs an additional ton, plus the momentum acquired by said weight in its fall, combined with the force and jetting action of water jetting from the lower toothed end of the shank pulverizes and erodes the difficult soils, thereby enabling the holepuncher to successfully and economically punch the hole to the requisite depth. In some cases this action is facilitated by a blast of compressed air. In other cases the air blast increases the difficulty of punching the hole to the requisite depth in such soils. It is found in practice that when the tubular shank is driven into the difficult soils, which in the case of dolomite, hardpan and bouldery soils, are hard and brittle, said soils will be shattered into small pieces and washed outwardly by said jetting between the teeth 3 and upwardly along the outside of said shank to the surface of the ground, so that no central core will be formed within the shank.

The installation of wellpoints by jets of water and/or of compressed air issuing from the lower tip of the wellpoint, or by the use of a weighted casing, with water jetting from the lower end thereof, result in little or no success in such difficult soils.

After the holepuncher has punched the hole to the requisite depth, the valve 13 is rotated to full open position and a wellpoint assembly inserted into the open upper end of the pressure cap, said assembly falling within the bore of the shank by gravity until the lower tip of the wellpoint is located at the lower end of the shank. The holepuncher is then removed, leaving the wellpoint assembly in place.

Without this sliding weight holepuncher, wellpoints could not be successfully and economically used in certain types of dewatering jobs. Where construction requires it wellpoints can be installed in difficult soils at an angle with this sliding weight holepuncher.

The right is reserved to modifications coming within the scope of the claims.

We claim:

1. A sliding weight holepuncher for the installation of wellpoints for withdrawing water from the ground comprising an elongated tubular cylindrical shank open at both ends thereof and having a lower toothed cutting edge, a hammer weight mounted and freely slidable upon said shank, manually controllable means for alternately raising said weight and releasing it to cause it to fall by gravity, and an anvil member upon which said weight falls, thereby driving said shank into the ground, said anvil member consisting of an upper striking plate, and a lower support therefor having a plurality of radial circumferential wings upon which said plate rests, said radial wings being each securely welded to said shank and to said plate by welds extending along the full lengths and breadths of said radial wings and located in both of opposite corners at the intersections of the vertical and horizontal edges of said radial wings with said shank and said plate, said radial wings being each of equal breadth throughout its length, said striking plate being provided with a superposed cushion of wood and a cushion retainer welded thereto, said shank having an upper tubular cylindrical cap open at both ends thereof and the bore of which is the same as that of said shank, said cap having therein a rotatable valve provided with a diametric port, the bore of which is of less diameter than that of said shank, said shank having inlet pipes for air and for water communicating with the bore thereof and located below said valve for jetting air and/or water through said shank when said valve is closed.

2. A sliding weight holepuncher for the installation of wellpoints for withdrawing water from the ground comprising an elongated tubular cylindrical shank open at both ends thereof and having a lower toothed cutting edge, a hammer weight mounted and freely slidable upon said shank, manually controllable means for alternatively raising said weight and releasing it to cause it to fall by gravity, and an anvil member securely welded to said shank and upon which said weight falls, thereby driving said shank into the ground, said shank having an upper tubular cylindrical cap open at both ends thereof and the bore of which is the same as that of said shank, said cap having a rotatable valve therein provided with a diametric port, the bore of which is of less diameter than that of said shank, said shank having inlet pipes for air and/or water communicating with the bore thereof and located below said valve for jetting air and/or water through said shank when said valve is closed.

References Cited in the file of this patent

UNITED STATES PATENTS

| | | |
|---|---|---|
| 50,576 | Graham | Oct. 24, 1865 |
| 144,475 | Phillips et al. | Nov. 11, 1873 |
| 175,672 | Crump | Apr. 4, 1876 |
| 267,605 | Sherman | Nov. 14, 1882 |
| 658,060 | Dudley | Sept. 18, 1900 |
| 940,733 | Sands | Nov. 23, 1909 |
| 1,008,904 | Harden et al. | Nov. 14, 1911 |
| 1,036,364 | Spooner | Aug. 20, 1912 |
| 1,983,428 | Zeidler | Dec. 4, 1934 |
| 2,416,501 | Sundbergh | Feb. 25, 1947 |
| 2,629,985 | McDowell | Mar. 3, 1953 |
| 2,665,886 | Ellis | Jan. 12, 1954 |
| 2,807,439 | Lipscomb | Sept. 24, 1957 |
| 2,833,120 | Barrett et al. | May 6, 1958 |
| 2,933,898 | Upson | Apr. 26, 1960 |

UNITED STATES PATENT OFFICE
CERTIFICATE OF CORRECTION

Patent No. 3,015,365 January 2, 1962

David H. Griffin et al.

It is hereby certified that error appears in the above numbered patent requiring correction and that the said Letters Patent should read as corrected below.

Column 4, line 13, for "alternatively" read -- alternately --.

Signed and sealed this 1st day of May 1962.

(SEAL)
Attest:

ERNEST W. SWIDER
Attesting Officer

DAVID L. LADD
Commissioner of Patents